US006663694B2

(12) United States Patent
Hubbard et al.

(10) Patent No.: US 6,663,694 B2
(45) Date of Patent: Dec. 16, 2003

(54) AIR-TO-AIR ATMOSPHERIC EXCHANGER FOR CONDENSING COOLING TOWER EFFLUENT

(75) Inventors: Bryan J. Hubbard, Overland Park, KS (US); Eldon F. Mockry, Lenexa, KS (US); O. L. Kinney, Jr., Overland Park, KS (US)

(73) Assignee: Marley Cooling Technologies, Inc., Overland Park, KS (US)

( * ) Notice: Subject to any disclaimer, the term of this patent is extended or adjusted under 35 U.S.C. 154(b) by 84 days.

(21) Appl. No.: 09/973,732

(22) Filed: Oct. 11, 2001

(65) Prior Publication Data

US 2003/0070547 A1 Apr. 17, 2003

(51) Int. Cl.[7] .......................... B01D 53/26; F28C 1/14; F28C 1/16
(52) U.S. Cl. .......................... 95/288; 261/152; 261/155; 261/157; 261/160; 261/161; 261/110; 261/111; 261/115; 261/DIG. 3; 261/DIG. 11; 261/DIG. 77; 165/157; 165/166; 165/177; 165/900; 165/DIG. 182; 165/DIG. 185; 165/DIG. 356; 165/DIG. 373; 165/DIG. 382; 165/DIG. 384; 210/652
(58) Field of Search ........................... 95/288; 261/110, 261/111, 115, 117, 118, DIG. 3, DIG. 11, DIG. 77, DIG. 86, DIG. 87, 152, 154, 155, 156, 157, 160, 161; 165/157, 166, 177, 900, DIG. 182, DIG. 185, DIG. 356, DIG. 373, DIG. 382, DIG. 383, DIG. 384; 210/652

(56) References Cited

U.S. PATENT DOCUMENTS

| | | | | | |
|---|---|---|---|---|---|
| 3,792,572 | A | * | 2/1974 | Turbin | 261/DIG. 77 |
| 3,923,935 | A | * | 12/1975 | Cates | 261/DIG. 11 |
| 3,995,689 | A | | 12/1976 | Cates | 165/166 |
| 4,076,771 | A | | 2/1978 | Houx, Jr. et al. | 261/159 |
| 4,099,928 | A | * | 7/1978 | Norback | 165/166 |
| 4,119,140 | A | | 10/1978 | Cates | 165/67 |
| 4,378,837 | A | * | 4/1983 | Ospelt | 165/166 |
| 4,556,105 | A | * | 12/1985 | Boner | 165/165 |
| 5,525,236 | A | * | 6/1996 | Wilkinson | 210/651 |
| 5,638,898 | A | | 6/1997 | Gu | 165/160 |
| 5,853,549 | A | | 12/1998 | Sephton | 203/2 |
| 5,944,094 | A | | 8/1999 | Kinney, Jr. et al. | 165/166 |
| 6,070,655 | A | | 6/2000 | Heikkila | 165/111 |
| 6,247,682 | B1 | * | 6/2001 | Vouche | 261/152 |
| 6,254,734 | B1 | | 7/2001 | Sephton | 203/2 |
| 6,260,830 | B1 | | 7/2001 | Harrison et al. | 261/112.2 |

OTHER PUBLICATIONS

Copy of International Search Report dated Jan. 13, 2003.
"The Desalting ABC's" by O.K. Buros for the International Desalination Association, 1990.
Cooling Tower Institute 1993 Annual Meeting Technical Paper No. TP93–01 "Plume Abatement and Water Conservation with the Wet/Dry Cooling Tower" by Paul A. Lindahl, Jr., et a.
"Open Multiple Effect Desalination with Low Temperature Process Heat", Baumgartner et al, International Symposium on Desalination and Water Re–Use, vol. 4, 1991.
"Zero Discharge Desalination", Lu et al, Proceedings from the ADA North American Biennial Conference and Exposition, Aug. 2000.

* cited by examiner

Primary Examiner—Duane Smith
Assistant Examiner—Jason M. Greene
(74) Attorney, Agent, or Firm—Baker & Hostetler LLP

(57) ABSTRACT

Heat exchanger packs having a first set of passageways for receiving a stream of ambient air and a second set of passageways for receiving a stream of warm water laden air is disclosed. The first set of passageways and second set of passageways being separate and permitting the warm water laden air stream to be cooled by the stream of ambient air so that water can condense out of the warm water laden air stream. Cooling tower configurations including the heat exchanger pack are disclosed for achieving effluent plume abatement, and capture of a portion of the effluent for replacement back into the cooling tower reservoir or as a source of purified water.

26 Claims, 17 Drawing Sheets

Cooling Tower High Efficiency Mode

Plume Abatement and Water Conservation Mode

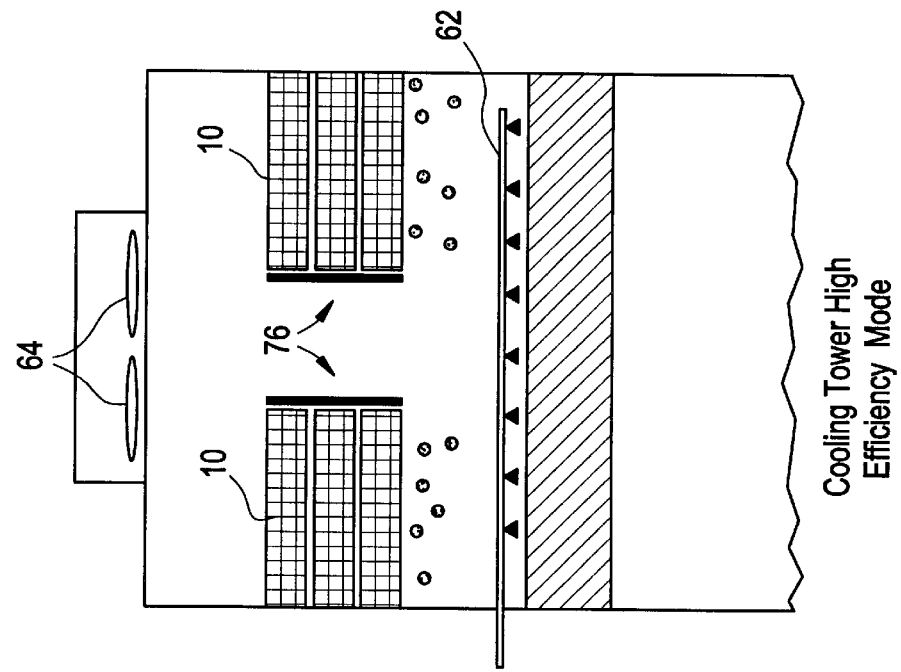
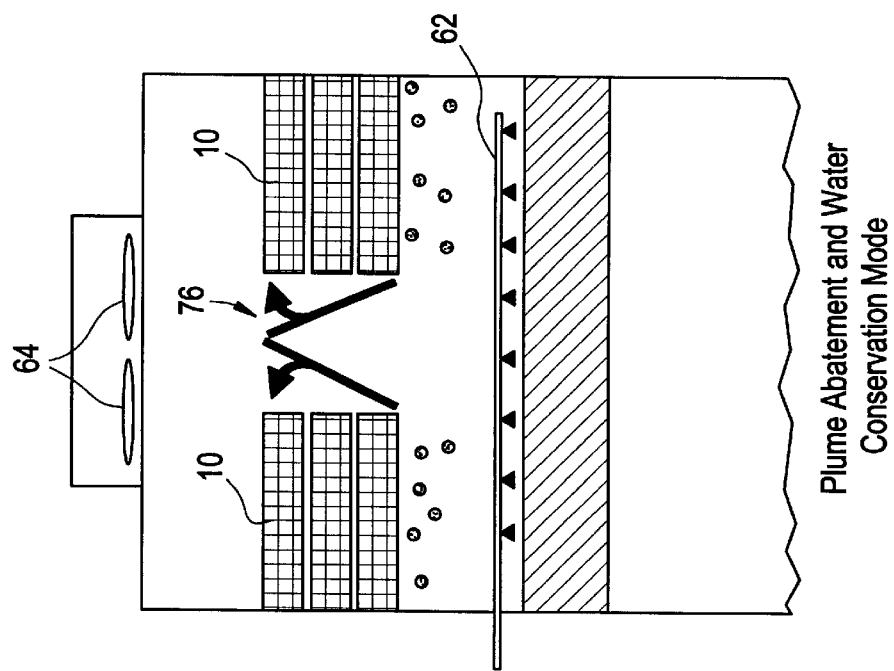

AIR-TO-AIR ATMOSPHERIC EXCHANGER FOR CONDENSING COOLING TOWER EFFLUENT

FIELD OF THE INVENTION

The present invention relates generally to water reclamation from cooling tower effluent or other heat rejection devices. More particularly, the present invention relates to method and apparatus for reclaiming water from cooling tower effluent to provide a source of clean water, reduce water consumption of the cooling tower, and/or to reduce the cooling tower plume.

BACKGROUND OF THE INVENTION

In electricity generation using steam driven turbines, water is heated by a burner to create steam which drives a turbine to creates electricity. In order to minimize the amount of clean water necessary for this process, the steam must be converted back into water, by removing heat, so that the water can be reused in the process. In air conditioning systems for large buildings, air inside the building is forced passed coils containing a cooled refrigerant gas thereby transferring heat from inside the building into the refrigerant gas. The warmed refrigerant is then piped outside the building where the excess heat must be removed from the refrigerant so that the refrigerant gas can be re-cooled and the cooling process continued.

In both of the foregoing processes, and numerous other processes that require the step of dissipating excess heat, cooling towers have been employed. In wet type cooling towers, water is pumped passed a condenser coil containing the heated steam, refrigerant, or other heated liquid or gas, thereby transferring heat into the water. The water is then pumped to the top of the cooling tower and sprayed over a cooling tower media comprised of thin sheets of material or splash bars. As the water flows down the cooling tower media, ambient air is forced passed the heated water and heat is transmitted from the water to the air by both sensible and evaporative heat transfer. The air is then forced out of the cooling tower and dissipated into the surrounding air.

Cooling towers are highly efficient and cost effective means of dissipating this excess heat and thus are widely used for this purpose. A recognized drawback to cooling towers, however, is that under certain atmospheric conditions a plume can be created by moisture from the heated water source evaporating into the air stream being carried out of the top of the cooling tower. Where the cooling tower is very large, as in the case of power plants, the plume can cause low lying fog in the vicinity of the cooling tower. The plume can also cause icing on roads in the vicinity of the cooling tower where colder temperatures cause the moisture in the plume to freeze.

Efforts have therefore been made to limit or eliminate the plume caused by cooling towers. Examples of such efforts can be found in the following United States Patents:

U.S. Pat. No. 6,247,682 to Vouche describes a plume abated cooling tower in which ambient air, in addition to being brought in at the bottom of the tower and forced upwards through a fill pack as hot water is sprayed down on the fill pack, is brought into the cooling tower through isolated heat conductive passageways below the hot water spray heads. These passageways which are made from a heat conductive material such as aluminum, copper, etc., allow the ambient air to absorb some of the heat without moisture being evaporated into the air. At the top of the tower the wet laden heated air and the dry heated air are mixed thereby reducing the plume.

U.S. Pat. No. 4,361,524 to Howlett describes a plume prevention system in which the hot water is partially cooled before being provided into the cooling tower. The partial cooling of the hot water is performed using a separate heat exchanger operating with a separate cooling medium such as air or water. As discussed in the patent, the separate heat exhanger reduces the efficiency of the cooling tower and thus should only be employed when atmospheric conditions exist in which a plume would be created by the cooling tower.

Another example of a system designed to reduce plume in a wet type cooling tower can be found in the "Technical Paper Number TP93-01" of the Cooling Tower Institute 1993 Annual Meeting, "Plume Abatement and Water Conservation with the Wet/Dry Cooling Tower," Paul A. Lindahl, Jr. et al. In the system described in this paper, hot water is first pumped through a dry air cooling section where air is forced across heat exchange fins connected to the flow. The water, which has been partially cooled, is then sprayed over a fill pack positioned below the dry air cooling section and air is forced through the fill pack to further cool the water. The wet air is then forced upwards within the tower and mixed with the heated dry air from the dry cooling process and forced out the top of the tower.

While the foregoing systems provide useful solutions to the wet cooling tower plume problem, they all require the construction of a complex and costly wet and dry air heat transfer mechanism. A simple and inexpensive wet and dry air cooling mechanism is still needed wherein dry heated air and wet laden heated air can be mixed before passing out of the cooling tower to thereby reduce the plume.

Another recognized problem with cooling towers is that the water used for cooling can become concentrated with contaminates. As water evaporates out of the cooling tower, additional water is added but it should be readily recognized that contaminants in the water will become more concentrated because they are not removed with the evaporate. If chemicals are added to the cooling water to treat the water these chemicals can become highly concentrated which may be undesirable if released into the environment. If seawater or waste water is used to replace the evaporated water, a common practice where fresh water is not available or costly, salts and solids in the water can also build up in the cooling water circuit As these contaminants become more concentrated they can become caked in between the thin evaporating sheets diminishing the towers cooling efficiency.

To prevent the foregoing problem it is a regular practice to "blowdown" a portion of the water with the concentrated contaminants and replace it with fresh water from the source. While this prevents the contaminants in the cooling tower water from becoming too concentrated, there may be environmental consequences to discharging water during the blowdown process. Efforts have therefore been made to reduce the water consumption in cooling towers.

U.S. Pat. No. 4,076,771 to Houx, et al. describes the current state-of-the-art in reducing the water consumption in a cooling tower. In the system described in this patent both cooling tower evaporative heat transfer media and a coil section that transfers heat sensibly are provided in the same system. The sensible heat transfer of the coils provides cooling of the process water but does not consume any water.

While the foregoing patent represents a significant advancement over prior art cooling towers, it would be desirable if a mechanism were developed for recapturing water from the plume for replacement back into the cooling tower water reservoir which did not require a coil section for sensible heat transfer.

A separate problem that has been noted is the desalination of sea water, and purification of other water supplies, to create potable drinking water. Numerous approaches have been developed to remove purified water from a moist air stream. The major commercial processes include Multi-Stage Flash Distillation, Multiple Effect Distillation, Vapor Compression Distillation, and Reverse Osmosis. See "The Desalting ABC's", prepared by O. K. Buros for the International Desalination Association, modified and reproduced by Research Department Saline Water Conversion Corporation, 1990. Examples of systems that use low temperature water for desalination or waste heat include the following:

"Zero Discharge Desalination", Lu et al, Proceedings from the ADA North American Biennial Conference and Exposition, August 2000. This paper provides information on a device that produces fresh water from a cold air stream and a warm moist air stream from a low grade waste heat source. The fresh water is condensed along the walls separating the two air streams. Also, a cold water is sprayed over the warm moist air to enhance condensation.

"Open Multiple Effect Desalination with Low Temperature Process Heat", Baumgartner et al, International Symposium on Desalination and Water Re-Use, Vol. 4, 1991. This paper provides information on a plastic tube heat exchanger used for desalination that uses cold running water on the inside of the plastic tubes and warm moist air flowing over the exterior of the tubes. The condensate forms on the outside of the cold tubes.

The foregoing show that there is a need for desalination systems for converting sea water, or other water supply containing high levels of contaminants, into a purer water supply. A simple and cost effective means of condensing the effluent of a cooling tower as a source of water would therefore be desirable.

SUMMARY OF THE INVENTION

In one aspect of the invention a heat exchanger is provided having a first set of passageways formed for receiving a first stream of air. A second set of passageways for receiving a second stream of air is also provided in the heat exchanger, the second stream of air being warmer than said first stream of air. Each passageway of the first set of passageways is separate but adjacent to at least one passageway of the second set of passageways so that heat from said second air stream will be absorbed by the first air stream. A reservoir for capturing moisture that condenses out of said second air stream is also provided.

In another aspect of the invention a heat exchanger is provided having two opposing walls configured with holes to allow for the passage of a first air stream. Tubes are provided between a hole in the first wall and a corresponding hole in the second wall for channeling the first air stream there through. Walls provided between at least two parallel edges of one wall and the corresponding parallel edges of said second wall ensure that a second air stream can be channeled passed said tubes to condensed moisture out of the second air stream. In another aspect of the invention a method of reducing the moisture content of an air stream is provided wherein a first air stream having a flow rate between 10 and 80 pounds of dry air per square foot per minute (pda/ft$^2$/min) and a relative humidity at or above 90% is directed through a first set of passageways. A second air stream having a flow rate between 10 and 80 pda/ft$^2$/min and a dry bulb temperature at least five Fahrenheit degrees below the second stream is directed through a second set of passageways. Each passageway of the first set of passageways being separated from at least one passageway of the second set of passageways by a thin heat conductive material. Heat from the second air stream is absorbed into the first air stream and water condensed out of the second air stream is captured. In yet another embodiment of the invention, a cooling tower is provided having a counterflow evaporative media and a water distribution system that distributes hot water over the counterflow evaporative media. A heat exchanger that absorbs heat from a first air stream into a second air stream is also provided, the heat exchanger having a first set of passageways and a second set of passageways. A fan in the cooling tower directs air through the counterflow evaporative media to create said first air stream and directs the first air stream, having a flow rate between 10 and 80 pounds of dry air per square foot per minute (pda/ft$^2$/min) and a relative humidity at or above 90%, through the first set of passageways. The fan also directs the second air stream having a flow rate between 10 and 80 pda/ft$^2$/min and a dry bulb temperature at least five Fahrenheit degrees below the second stream through the second set of passageways. Each passageway of the first set of passageways being separated from at least one passageway of the second set of passageways by a thin heat conductive material. A reservoir is provided for capturing water condensed out of the first air stream.

In another aspect of the invention a cooling tower is provided having a fan at the top of the cooling tower for creating a negative pressure inside the cooling tower. A counterflow evaporative media is provided along with spray heads that spray hot water onto the counterflow evaporative media. A heat exchanger having a first set of passageways for passing an air stream from outside the cooling tower into the center of the tower and a second set of passageways for passing an effluent air stream from the evaporative media is also provided in the heat exchanger. The air stream from outside the cooling tower absorbs heat from the effluent air stream and thereby condenses water out of the effluent.

In yet another aspect of the invention, a cooling tower is provided with a fan at the top of the cooling tower for creating a negative pressure inside the cooling tower. A crossflow evaporative media and a hot water distribution system that sprays hot water onto the crossflow evaporative media are provided. A heat exchanger having a first set of passageways for passing a first air stream from outside the cooling tower into the center of the tower and a second set of passageways for passing an effluent air stream from said evaporative media is provided. The air stream from outside the cooling tower absorbs heat from the effluent air stream and thereby condenses water out of the effluent.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIGS. 8A and 8B are block diagram representations of a cooling tower in accordance with another preferred embodiment of the invention.

DETAILED DESCRIPTION OF PREFERRED EMBODIMENTS OF THE INVENTION

Heat Exchanger Pack

Figure 1:
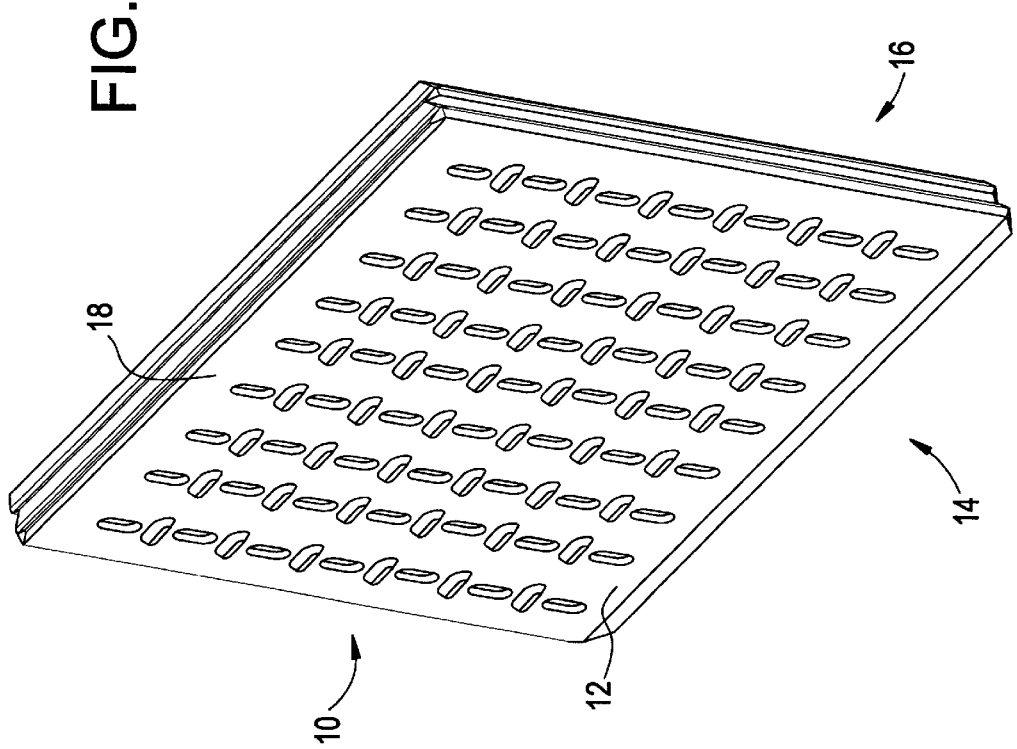
FIG. 1 is a perspective view of a portion of a heat exchanger of a preferred embodiment of the invention.

Referring now to the figures wherein like reference numerals indicate like elements, in FIG. 1 there is shown a vapor condensing heat exchanger pack 10. The heat exchanger pack 10 is constructed of thin sheets 12 that are bonded together to form a pack that has a first path 14 and a second path 16 for two different air streams. In a preferred embodiment, the two air streams enter the heat exchanger pack 10 at right angles to each other and are kept separate by the thin sheets 12.

The thin sheets 12 are a relatively thin synthetic resin material that are shaped to assist in condensing vapor from a heated water laden air stream passing through passageways 14 and transferring heat to a cool air stream passing through passageways 16. In a preferred embodiment, the material is 0.005 to 0.040 inches in thickness but is preferably 0.015 to 0.020 inches in thickness. The surface 18 may be textured to provide extended surface area presented to each of the air streams with a minimal amount of resistance to the air stream flow. Examples of texture patterns appropriate for such use can be found in U.S. Pat. No. 5,944,094 to Kinney, Jr. et al. and U.S. Pat. No. 3,995,689 to Cates, the disclosures of which are incorporated herein by reference. Other texture patterns may include but not be limited to textures such as dimples similar to golf ball texture and gridded texture similar to a screen pattern embossed in the plastic sheet. This increased surface area enhances the heat transfer capabilities of the thin sheet and increases the velocity fluctuations near the sheet surface, which improves the local mixing of the individual air stream. The increased fluctuations and resulting local mixing of the air stream also improves the heat transfer capabilities of the sheet.

Figure 2:
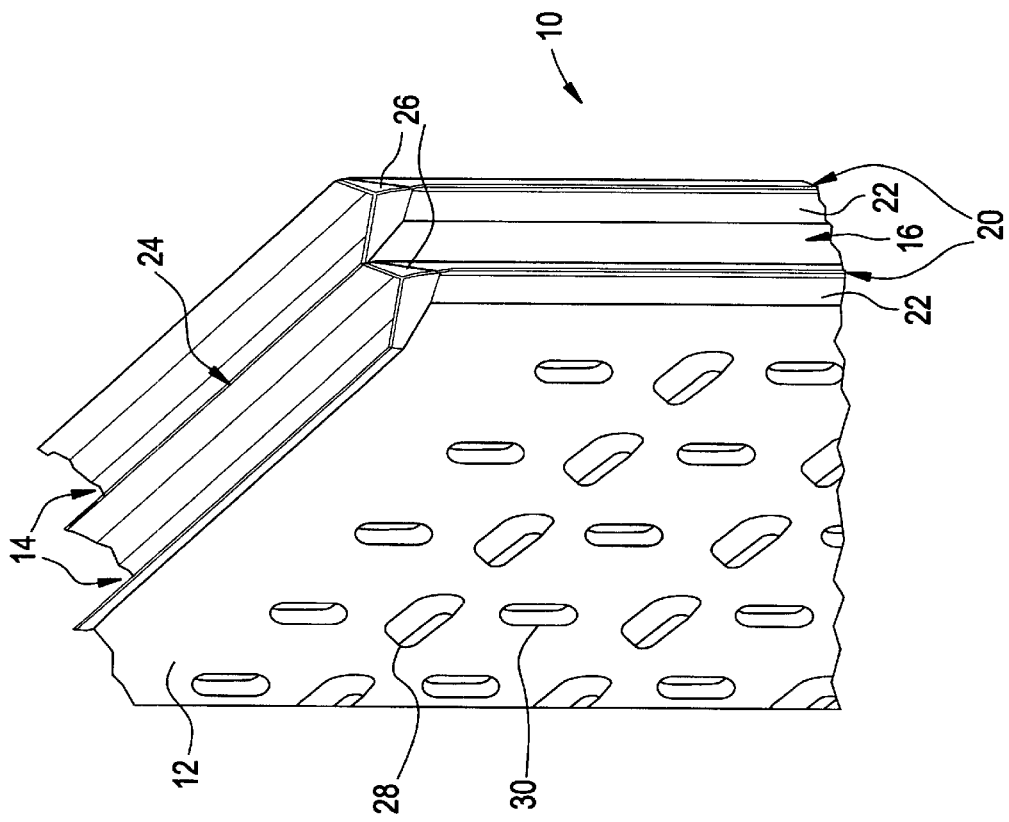
FIG. 2 is a perspective view of a section of the heat exchanger of FIG. 1 enlarged to show detail.

As depicted in FIG. 2, to prevent the two air streams from mixing during the heat exchange process, a seal 20 is formed in the thin synthetic resin sheet on a first edge. This seal is formed by the raised edges 22 of the thin sheet material 12, on one edge of the sheets 12, that meet in the center of the air passageways 14, or in other words, is raised one-half the width of the passageways 14. This edge seal 20 extends along the length of the air passageway 14 parallel to the air passageways 16.

Similarly, a seal 24 is formed by the raised edges 26 of the thin sheet material 12, on the edge perpendicular to the seal 20, that meet in the center of the air passageway 16, or in other words, is raised one half the width of the passageway 16. This edge seal 24 extends the length of the air passageway 16 parallel to the air passageway 14.

Although not shown, the edge parallel to seal 20 and the edge parallel to seal 24 are similarly bonded. Thus, perpendicular passageways 14, 16 are formed within the heat exchanger pack.

One raised edge 26 extends positively off of the formed sheet and the other 22 downward or negatively. In this arrangement a single sheet component can be used to form the basis of the entire heat exchanger pack. This is accomplished when assembling the pack by stacking the sheets 12 on top of each other and turning over every other sheet and locating it on the previous sheet. Although only three passageways are depicted, it should be readily recognized that in use the heat exchanger pack will have many perpendicular passageways and that any number of passageways can be formed using the sheets 12 as disclosed herein.

To maintain the opening of the air pathways, spacer knobs or buttons are formed in the thin sheet material. These buttons are spaced similarly to the edge seal and extend either positively 28 from the formed sheet or negatively 30 from the formed sheet a distance of half of the width of the air passage opening. In a preferred embodiment, the buttons 28 that extend positively are conoidal in shape having a flat top surface when viewed in the direction of the air flow through passageway 16. When placed together the flat surfaces of the buttons of one sheet are arranged opposite the flat surface of the buttons on the adjacent sheet. Each of the positively protruding buttons 28 extends along a length of the thin sheet parallel to the direction of airflow. In a preferred embodiment, the buttons 30 which protrude negatively have the same shape as the buttons 28 that protrude positively but are perpendicular in orientation. Again, the negatively protruding buttons 30 of one sheet are arranged opposite the negatively protruding buttons of the adjacent sheet. An alternate spacer embodiment which positions and interlocks the sheets may be found in Kinney '094.

The foregoing features are designed to maintain a consistent width of the air passageways and resist collapsing the passageways when a differential pressure is applied between the two passageways. The configuration of the buttons is also designed to provide a minimal resistance to airflow while providing sufficient structural resistance to collapse of the passageways.

The width of each of the passageways for either the cool air stream or the vapor laden air stream can be varied according to the design conditions of the particular task. Also, the cool air passageway 16 and the vapor laden air passageway 14 do not necessarily have to be of equal widths. Practically, for the particular tasks of the current invention, the passageway widths would be at a minimum of 0.5 inches wide and a maximum of 3.0 inches wide with a preferred width between 1.0 inches and 1.5 inches.

The overall dimensions of the completed pack of thin sheets are also dependent on the particular design task associated with the invention. However, the minimal pack size envisioned for the design is 2 feet by 2 feet and the maximum is 6 feet by 24 feet.

The air entering the face of a heat exchanger pack is characterized by the mass flow over the gross face area. Typically this is expressed as pounds of dry air per square foot of area per minute ($pda/ft^2/min$). In the preferred embodiment, each set of air passages has a mass flow rate between about 10 $pda/ft^2/min$ to about 60 $pda/ft^2/min$.

The temperatures of the warm moist air stream for the preferred embodiment of the three processes, water conservation, water purification, and plume abatement, are typical of those experienced by cooling towers and other waste heat rejection devices. These temperatures would range from a maximum of about 150 degrees F. to a minimum of about 40 degrees F. Evaporative cooling towers typically discharge air that is saturated or nearly saturated (about 100% relative humidity). Similar evaporative devices that supply air with a relative humidity of about 90% or higher are feasible for this invention. Air streams with relative humidities below about 90% require significant sensible heat transfer to cool the air streams to their respective dew points. Condensation can only take place after the air stream reaches the saturation curve at the dew point.

For the preferred embodiment the operating pressures for the heat exchanger pack will be about the same as typical cooling tower operating pressures, in a range of +/−6 millibars. In general cooling towers operate at or near atmospheric pressure. Cooling towers have axial fans and/or blowers, also known as centrifugal fans, that create slight changes from atmospheric pressure to generate flow through the packing media, spray, and drift eliminators. These different components cause a restriction to the air flow by friction and velocity differentials hence a pressure change from atmospheric is required to force the air through the tower. These pressures are typically in a range of +/−3 millibars for axial fan systems and +/−6 millibars for systems with a blower. It is customary to consider such cooling tower systems operating at these relative small pressure differentials to be operating at atmospheric pressure.

General Condensation Process

As described, the vapor-condensing heat exchanger is arranged in a pack with passageways for two different air streams. In the passageways 16 cool air is delivered from an outside source or from the surrounding ambient air mass. The method of obtaining the cool air is dependent on the specific application for the device. The cool air temperature will typically be significantly below the air mass temperature of the air stream in the opposing passageways 14. In the opposing passageway 14 warm moist air is delivered into the path. The warm moist air is typically saturated with water vapor or has a dry bulb temperature that is at or near the resulting wet bulb temperature. This air mass is similar to that generated by a cooling tower which is used to reject waste heat from a process. However, other processes and methods that generate a similar warm moist air stream can be used for the input into this device such as an evaporative condenser.

Figure 3:
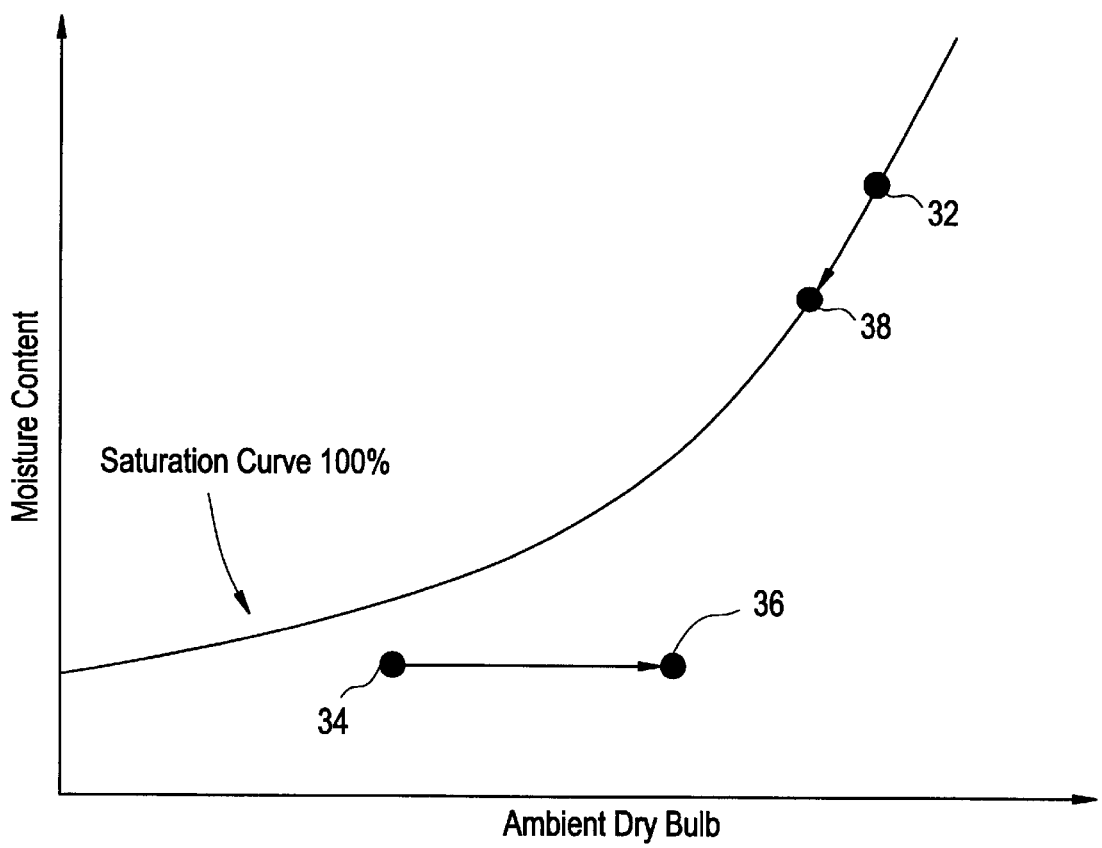
FIG. 3 is a graphical representation of a psychrometric chart for a heat exchanger.

As shown in the psychrometric chart of FIG. 3, the warm moist air is at a point 32 on the depicted saturation curve. The location of the point 32 on the saturation curve where the warm moist air is indicates that it is 100% saturated with water vapor at a high temperature. The cool air entering the other passageway is located at a point below the saturation curve 34. The location of the cool air on the psychrometric chart indicates that it is at a lower temperature than the entering warm air. The moisture content associated with this air stream is generally not relevant to the functionality of the device. In the case of plume abatement, however, the moisture content of the entering air effects not only the moisture content of the "mix", but also the tangency of the mix line.

As the two air streams pass through the heat exchanger the warm air stream is cooled and the cold air stream increases in temperature. Because the two air streams do not physically contact each other, the cool air stream is heated in a way that no moisture is added or removed from the air stream. This is known as a sensible heating of the air stream. As noted on the psychrometric chart, upon exiting the heat exchanger the cool air has an increased temperature but the moisture content has been maintained constant 36.

The warm moist air is cooled from its initial point on the saturation curve 32 to a lower temperature. As the warm moist air mass is cooled the moisture content of the air stream must be reduced. Since the air stream is 100% saturated, water will condense out of the air stream and the resulting decrease in temperature will follow the 100% saturation curve to the new cooler temperature 38. The amount of heat lost in the warm saturated air stream must equal the amount of heat gained in the cool dry air stream.

Desalination research led to the serendipitous discovery that the exiting dry air of the air to air exchanger was much higher than expected. This discovery makes possible plume abatement with a device previously assumed inadequate. Conventional wisdom suggested that an air-to-air heat exchanger for plume abatement is much less effective than a water-to-air heat exchanger such as coils or the plastic heat exchanger as disclosed by Kinney in '094. Cool ambient air is drawn from outside of the tower and heated sensibly. The heat source for warming this air would seem to favor water over air because of it's much larger mass. For example the plastic heat exchanger in '094, typically has a flow rate of 20 gpm/sf or more. The mass flow rate then is typically 20 gpm/sf×8.33 lbm/gallon=167 lbm/sf/min or more. The air-to-air heat exchanger as discussed above operates in a range from 10 to 80 pda/sf/min. The total mass flow is determined by multiplying the dry air rate times $(1+w_s)$ in which $w_s$ is the humidity ratio. Assuming 100° F. saturated air, the humidity ratio, $w_s$ is 0.0432. The mass of this air stream varies from 10.4 to 83.5 lbm/sf/min. Therefore, the water flow mass of the '094 plastic heat exchanger is typically several times greater than the air flow mass of the present invention. For comparable amounts of dry heat the air to air exchanger would seem to require a change in temperature of both air streams of several times that of the water stream in the '094 heat exchanger. This was not thought to be possible unless the surface was increased several times the surface area of the water-to air heat exchanger to accomplish the same heat transfer. Therefore, the size of the air-to-air heat exchanger would seem to increase to unmanageable or uneconomic proportions. However, using the heat exchanger of 10, FIG. 1., described previously the warm moist air stream is subject to a condensation process. In the condensation process, warm air comes in contact with a cool surface and water condenses out of the air. In this process both sensible and latent heat are released and the absolute humidity is reduced. Since both latent and sensible heat is transferred in the device it becomes much more efficient than previously thought possible.

In the passageway with the warm moist air 14, when the vapor comes in contact with the cool surface of the cool passageway, droplets of condensate are formed on the surface of the passageway with the warm moist air stream. These droplets are a result of the warm moist air being cooled and the resulting moisture reduction of the air stream. These droplets coalesce on the sheet and flow down the warm moist air stream passageway surface of the sheet. The moisture that condenses onto the sheet can either be collected at the base of the sheet or returned into the original source. The use of this water will be discussed further below.

Processes for Heat Exchanger

A. Water Conservation for Cooling Towers

As discussed in the previous section, warm moist air flowing through the heat exchanger passageway is cooled and the moisture content is reduced. The reduction in moisture content of the warm air causes droplets to be formed on the warm air passageway of the sheet. These droplets coalesce and fall from the bottom of the sheet. The water reclaimed from the moist air stream can be used to reduce the water consumption of a cooling tower apparatus.

Cooling towers reduce the temperature of process water through an evaporative process and thus provide a place to remove heat from a system. The heat removed is typically not useful for other processes and labeled "low grade waste heat" and is released to the surrounding atmosphere. Through the cooling tower process a certain percentage of the process water that is circulating through the system is lost due to evaporation. The amount of water lost through the evaporation process is typically between 0.5% to 3% of the total flow rate. Generally this is roughly 0.8% for every 10° F. of cooling of the process water. This loss of water can be costly to operators of cooling tower apparatuses.

The water leaving the tower through evaporation is in a pure vapor state, therefore, other contaminants such as solids, dissolved solids, salts, etc., are left in the process water. Over time, as pure water is removed these contaminates build up in the process water. To reduce the contaminants a certain percentage of the process water is removed continually. The water removed from the system is called blowdown. Therefore, to operate a cooling tower water must be added to both compensate for the evaporation of the water and the required blowdown. In many instances this water is difficult to discharge directly into the environment because of the quality of the chemical laden water and the increased regulations associated with discharging water. Therefore, there is a significant economic advantage in reducing the amount of blowdown.

With the air to air heat exchanger 10, FIG. 1, described above water reclaimed from the warm moist air stream can be put back into the system. This will in effect reduce both the evaporation of the tower and the required blowdown of the system. Configurations of a cooling tower incorporating this heat exchanger will be described below. Since the water returned to the cooling tower system is nearly pure water, in many instances, it may be of better quality than the original make-up water. This improved water quality could also potentially reduce the amount of chemicals required for the cooling tower process.

In order for the heat exchanger to operate effectively and return water back into the system, the air temperatures entering into the cool air passageway must be below the warm air entering the opposing passageway. For a water conservation apparatus, as the two temperatures become closer to the same value the amount of water returned to the basin will be less. If the cool side of the heat exchanger is supplied with ambient air temperatures and not cooled by other means, the heat exchanger will return more water when the temperatures are cooler or during winter operation. During summer operation the heat exchanger will return less water. Typical values of water returned back into the basin will range from 40% of the evaporated water during the winter months to 3% of the evaporated water during summer operation. Water returned on an annual basis would be around 10% to 30% depending on the location. Table 1 below shows the percentage of evaporation water reclaimed for various locations in summer and winter. The numbers provided are for maximum water reclaimed from cooling tower effluent based on local conditions and a power plant duty of a 25-degree Fahrenheit range.

|  | Wyoming | Nevada | Florida | New York | Saudi Arabia |
| --- | --- | --- | --- | --- | --- |
| Summer | 15% | 3% | 11% | 16% | 3% |
| Winter | 40% | 23% | 21% | 32% | 14% |

B. Water Purification and Desalination

A cooling tower generates warm moist air during the evaporation heat rejection process. This warm moist air contains nearly pure vapor and is free of most contaminants such as solids, dissolved solids, salts, and chemicals. A significant portion of this pure vapor can be recovered when this type of heat exchanger is employed. In addition to recycling the water back into the cooling tower reservoir, the pure vapor when converted back into the water state can be used for other applications that require a source of clean water. Because of the expense associated with providing process water for cooling towers, often the make-up water used is either salt water from ocean sources or wastewater from an industrial process. When employed as a water reclamation device this heat exchanger is capable of converting water that is otherwise undesirable because of the quality of water.

While not pure, the resultant water will be free of most impurities. Viruses, biological impurities, and a small amount of dissolved solids may be entrained in the vapor. Also, a small amount of process cooling water may also be entrained into the moist air stream and contaminate the condensed water. This type of carry over is termed "drift" in the cooling tower industry. A secondary purification process may be employed to obtain further levels of desired water quality. The advantage provided by the present process can be seen in the case of sea water desalination to create potable water. In the case of desalination of sea water, one of the most expensive steps in the process is removing the salts. The foregoing cooling tower reclamation process could be used to reduce the salt content considerably so that a less expensive process could be used for the final purification of the water. An example of a process that can be used for the final purification process is reverse osmosis.

The process of recovering the water for other uses is essentially the same as has been described previously in the water conservation section above with the exception that the water recovered from the heat exchanger pack can be collected in a separate basin. Details of a cooling tower application with a recovery basin are described below.

As with the water conservation tower, if the surrounding air is used as the source for the cool side temperatures, as air temperatures increase during the summer months the production of clean water will decrease. Typical water recovered from this system will be 20% to 25% of the total water evaporated on an annual basis. If a source of either cold air or water is available more water could be reclaimed from the system. For example, if a source of cold ocean water is available it could be used to cool the incoming air in the cold passageway of the heat exchanger. As the temperature difference increases between the warm and cold side of the heat exchanger sheet the condensation will increase and thus more clean water will be generated. A configuration that would improve the rate of clean water production when a source of cold seawater is available will be described below.

The water purification device is well suited for use in a cooling tower because of the generation of warm moist air, however other devices that generate warm moist air could also be used in conjunction with this device.

C. Plume Abatement for Cooling Towers

The heat exchanger of the present invention can also be used to reduce the visible plume of a cooling tower. This process is essentially the same process as the water conservation process. The only difference is the cold air heated in the cold side passageway is mixed with the warm moisture laden air stream. The mixture of these two air streams can effectively reduce the presence of the visible plume by an approach different than typical plume abatement towers.

Figure 4:
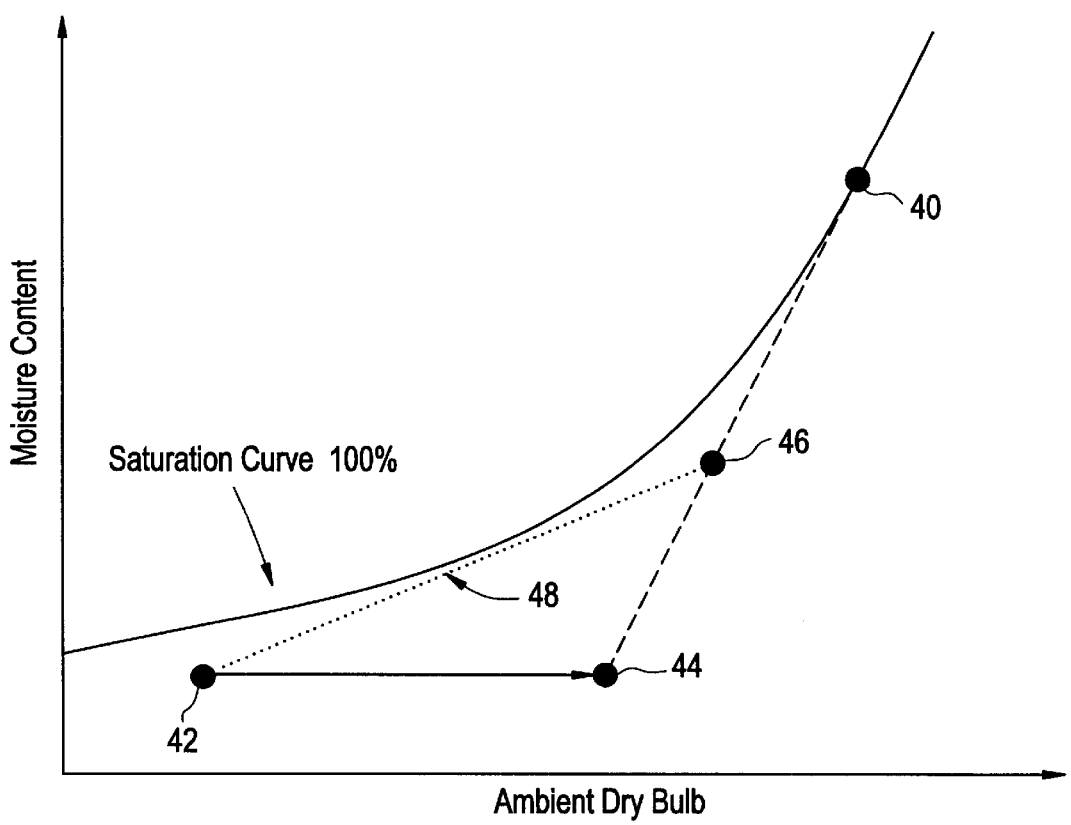
FIG. 4 is a graphical representation of a psychrometric chart for a plume abatement process.

A typical method used to reduce the visible plume in a cooling tower is depicted on the psychrometric chart of FIG. 4. As depicted in the chart, effluent air from the evaporative section of a cooling tower is warm 100% saturated air 40. Warm water from the heat source is also sent through a coil or other heat exchanger located on the side of the tower. The warm water is used to heat the ambient air 42. Air is then pulled through both the evaporative heat section and the water/air heat exchanger. The ambient air 42 that flows through the water/air heat exchanger is heated without any change in the moisture content (i.e. sensible heat transfer) 44. The warm dry air 44 then exits from the air/water heat exchanger.

The warm dry air stream 44 exiting the air/water heat exchanger is then mixed with the moist air stream 40 exiting the evaporative section of the cooling tower. The mixture of these two air streams results in an air stream 46 which has the property that when the exiting cooling tower air stream 46 temperature and the ambient air temperature 42 are connected with a line on a psychrometric chart, the connecting line 48 does not cross over the 100% saturation curve. If the connecting line 48 were to cross over the 100% saturation curve when the ambient and exiting air are mixed, condensation of the water vapor from the air stream of the evaporative section would occur creating a visible plume or fog. The area above the 100% saturation curve is the super saturated area and is also termed the fog area. Therefore, systems are designed such that when the properties of the air mass exiting the cooling towers and the ambient air mass properties are mixed no visible plume will occur for a given design condition.

Using the air to air heat exchanger 10, FIG. 1, of the present invention, the typical process is modified by reducing the moisture content of the air stream from the evaporative section and providing a source of warm dry heat to reduce the plume. The reduction in moisture of the warm moist air stream is a reduction in the absolute humidity of the air stream. The water content of the air from the evaporative section of the cooling tower is reduced by use of the air to air heat exchanger as described above. The source of the warm dry air is the ambient air that is heated in the heat exchanger from the cold air passage.

Figure 5:
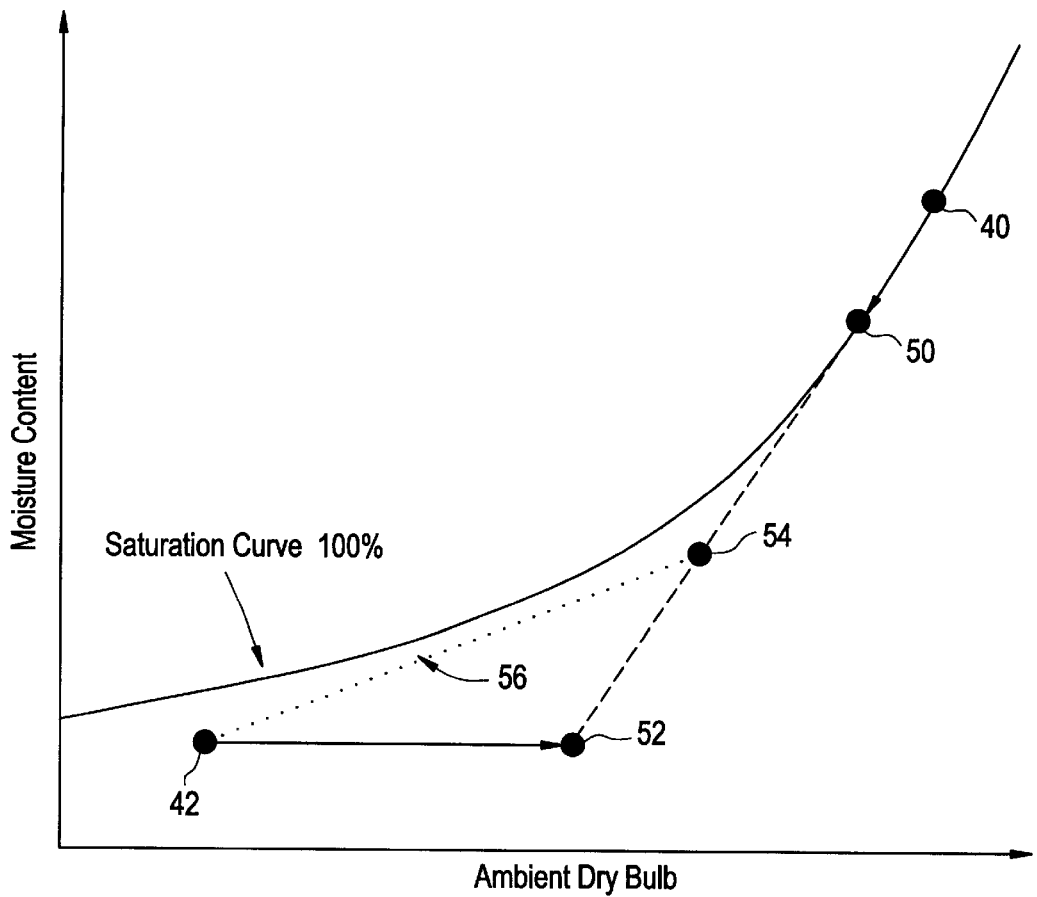
FIG. 5 is a graphical representation of a psychrometric chart for a plume abatement process with a moisture condensing heat exchanger.

The plume abatement process with the air to air heat exchanger of the present invention is depicted in the psychrometric chart of FIG. 5. As the exiting air from the cooling tower evaporative section 40 passes through the heat exchanger the temperature and moisture content are reduced 50. The ambient air, 42, is heated in the opposing passageway resulting in a warmer dry air stream 52. The two air streams are mixed together forming a resultant air mass 54 below the saturation curve. When the ambient air mass 42 is mixed with the air mass from the mix of the two air streams 54 in the cooling tower the properties do not cross over into the super saturation area of the curve or the fog area. This is depicted by a line 56 connecting the ambient air mass 42 and the mixed air mass 54 on the psychrometric chart.

The foregoing method for plume abatement is very effective for the reduction of the plume because moisture that could cause a plume to form is partially removed from the tower before entering the surrounding ambient conditions. The method is also less complicated because there is no water used in the heat exchanger system. Since no water is used in the heat exchanger it eliminates the complexity of providing another piping system for the cooling tower.

Cooling Tower Configurations

Figure 6:
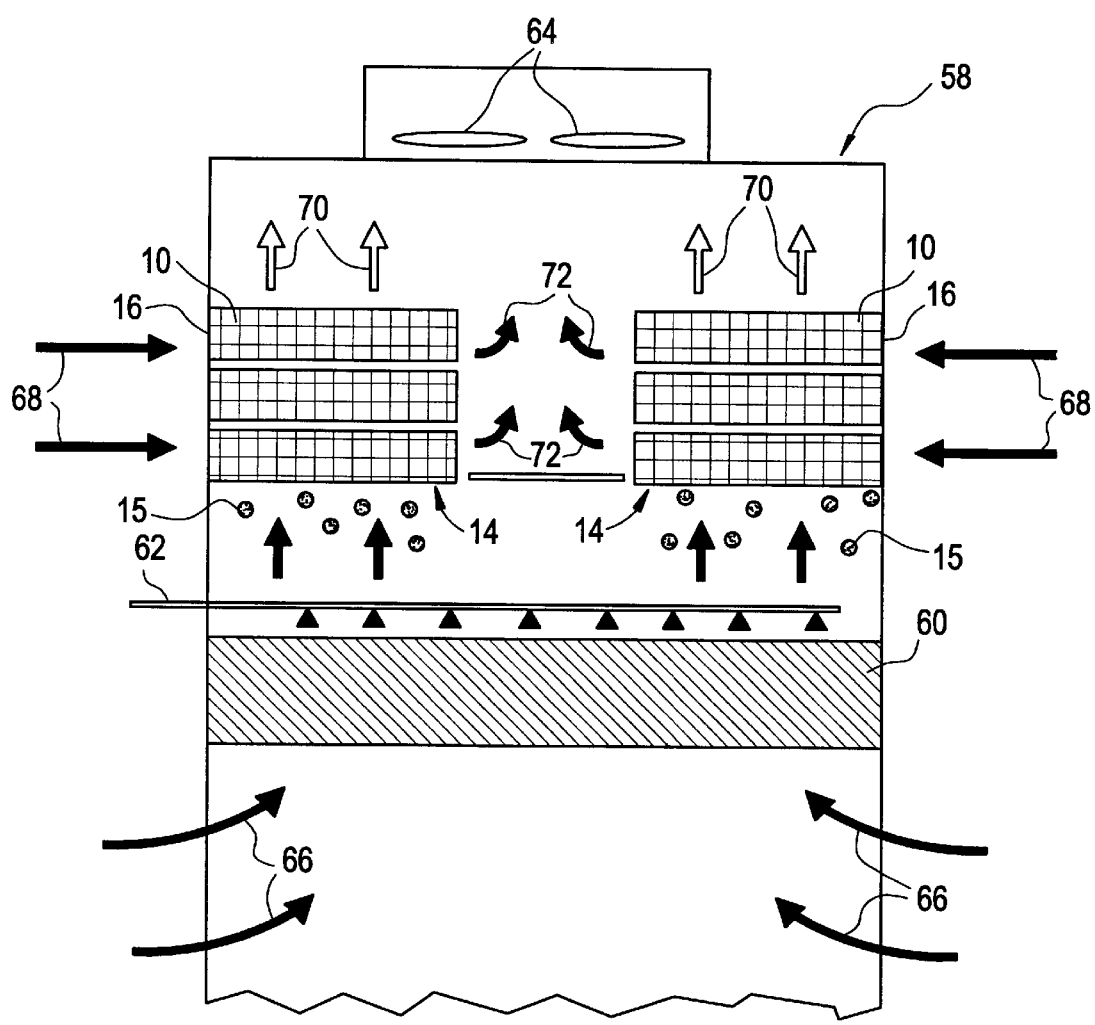
FIG. 6 is a block diagram representation of a cooling tower in accordance with a preferred embodiment of the invention.

A first preferred embodiment of a cooling tower 58 employing the heat exchanger described above is depicted in FIG. 6. In this configuration the heat exchanger 10 is located above the evaporative media 60 in a counterflow arrangement. This placement of the heat exchanger would be best suited for the water conservation and plume abatement configurations. The process employed by this cooling tower is as described below.

Hot water from the heat source is pumped through a conduit having spray heads 62 and sprayed over the evaporative media 60. An axial fan (or fans) 64 assist airflow of cool ambient air 66 through the evaporative media. In the evaporative media 60, the air is heated and moisture is evaporated into the air stream. The heated water laden air is then directed through air flow passageways 14 of the heat exchanger 10. Ambient air 68 is also directed through separate passageways 16 of the heat exchanger perpendicular to the flow of the heated water laden air. The cool ambient air 68 generates a cool surface on the heat exchanger 10 for the vapor to condense on. The condensate 15 will fall from the heat exchanger back into the main water collection area of the cooling tower. Condensate droplets size is exaggerated in the Figures for clarity. The two air streams 70, 72 exiting the heat exchanger 10 are combined near the fan inlet.

Figure 7B:
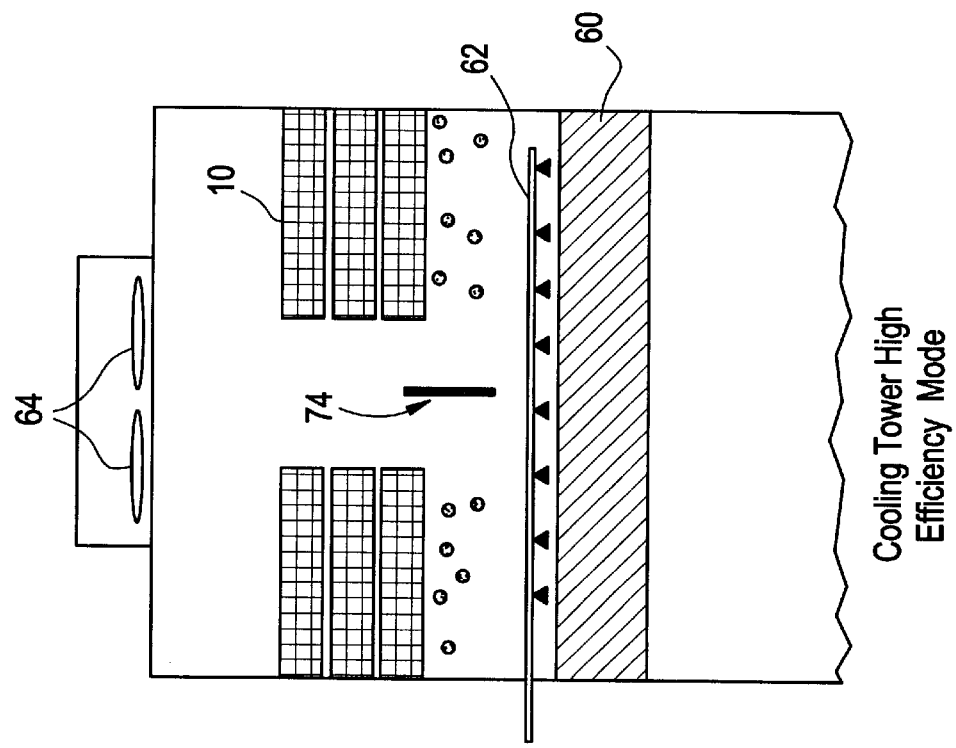
FIGS. 7A and 7B are block diagram representations of a cooling tower in accordance with another preferred embodiment of the invention.
Figure 7A:
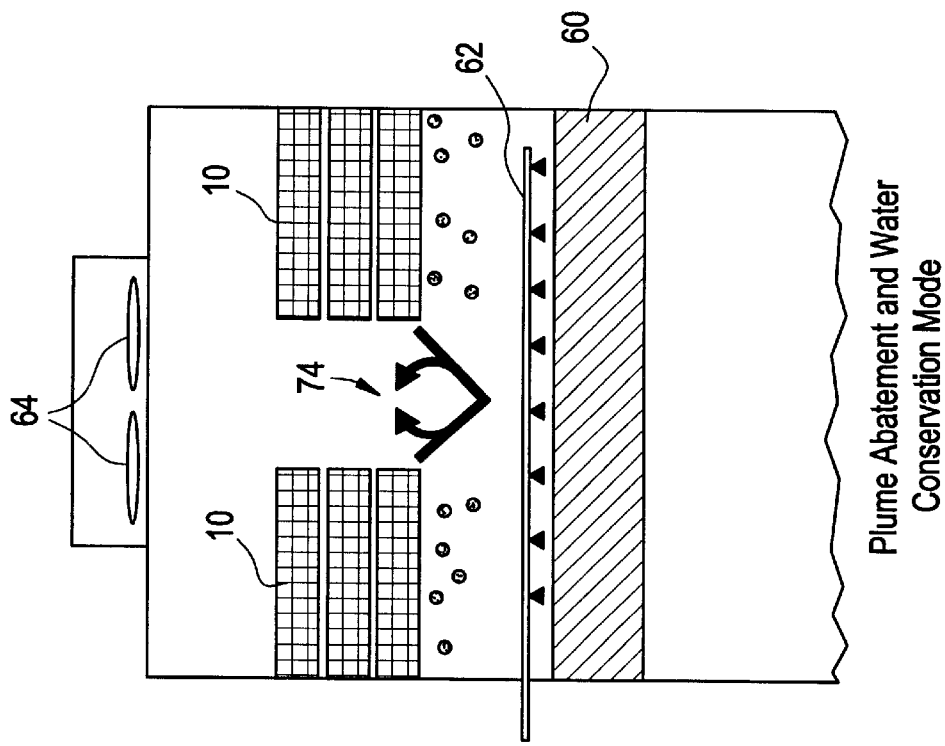

The air-to-air heat exchanger 10 when incorporated into a cooling tower will create a resistance to the fan 64. The increased resistance will require that the power be increased to the fan 64 in order to maintain the same flow rate through the cooling section with the addition of the heat exchanger 10. As depicted in FIGS. 7A and 7B, during operational times when more cooling tower performance is necessary, air vent doors 74 located in the tower may be opened. When opening these doors 74 a significant amount of air will bypass the heat exchanger 10 and go directly to the fan 64. This will reduce the air resistance created by the heat exchanger 10 and increase the amount of air that will flow through the cooling tower media 60. By increasing the airflow through the media 60, the performance of the cooling tower will increase. However, when bypassing the heat exchanger 10 the water conservation, water purification, and plume abatement processes are halted.

An alternate embodiment of the doors are depicted in FIGS. 8A and 8B. In this configuration the doors 76 not only provide a method to allow the warm moist air to bypass the heat exchanger 10, but also provides a way to close off the cold side of the heat exchanger. In effect, becoming damper doors.

Figure 9:
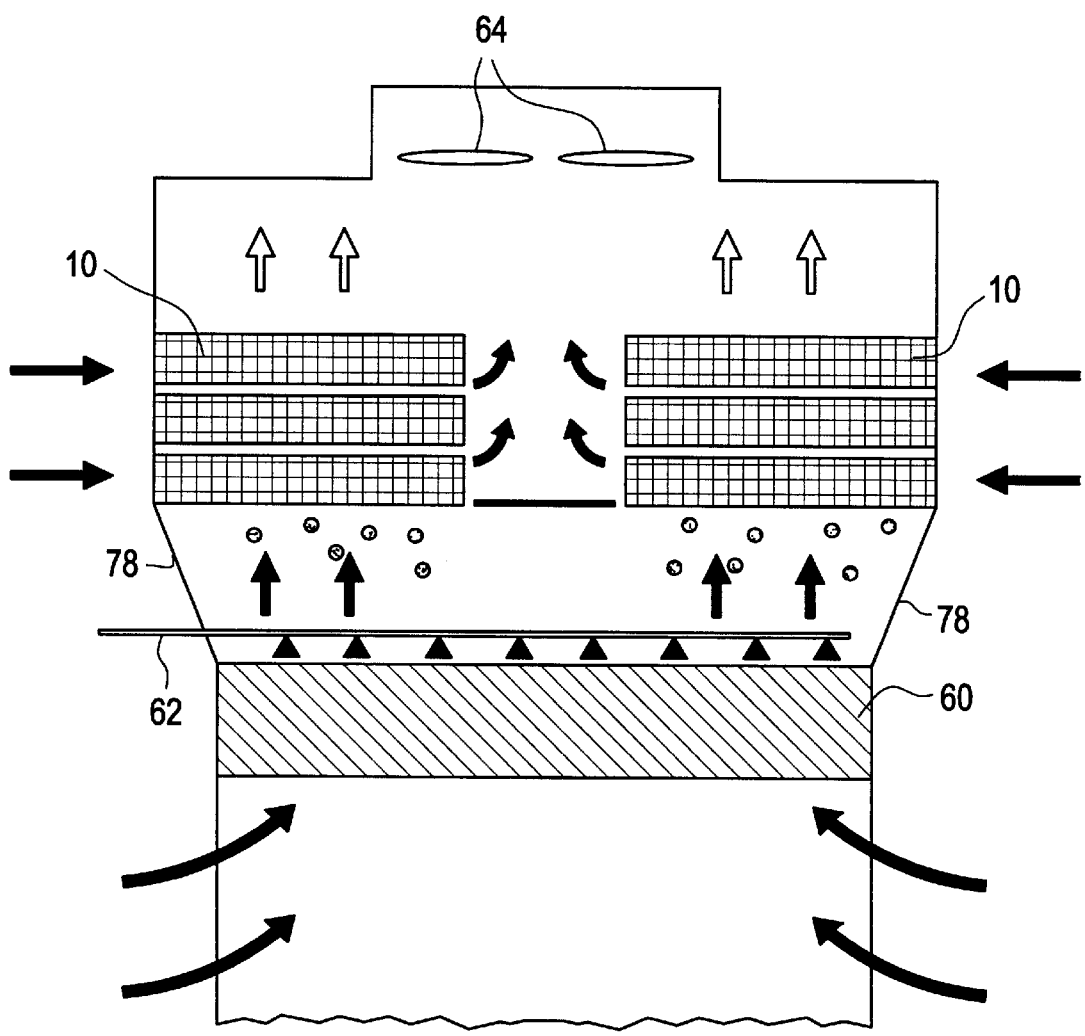
FIG. 9 is a block diagram representation of a cooling tower in accordance with another preferred embodiment of the invention.

Another method to reduce the amount of resistance in the heat exchanger 10 is to increase the flow area of the heat exchanger pack. As depicted in FIG. 9, in order for two different air streams (warm moist air and cold ambient air) to flow through the single fan 64 of a cooling tower, a portion of the flow area from the cooling tower media is blocked off. Since a portion of the flow area is blocked off the velocity of the air stream must be increased accordingly. This increased velocity of the flow creates more resistance when passing through the heat exchanger 10. In order to reduce the resistance, the heat exchanger flow area may be expanded by the amount of the blockage. In this configuration the heat exchanger pack 10 is in effect cantilevered beyond the cooling tower media 60. This reduces the velocity of the warm moist air through the heat exchanger and reduces the amount of pressure drop in the system.

Figure 10:
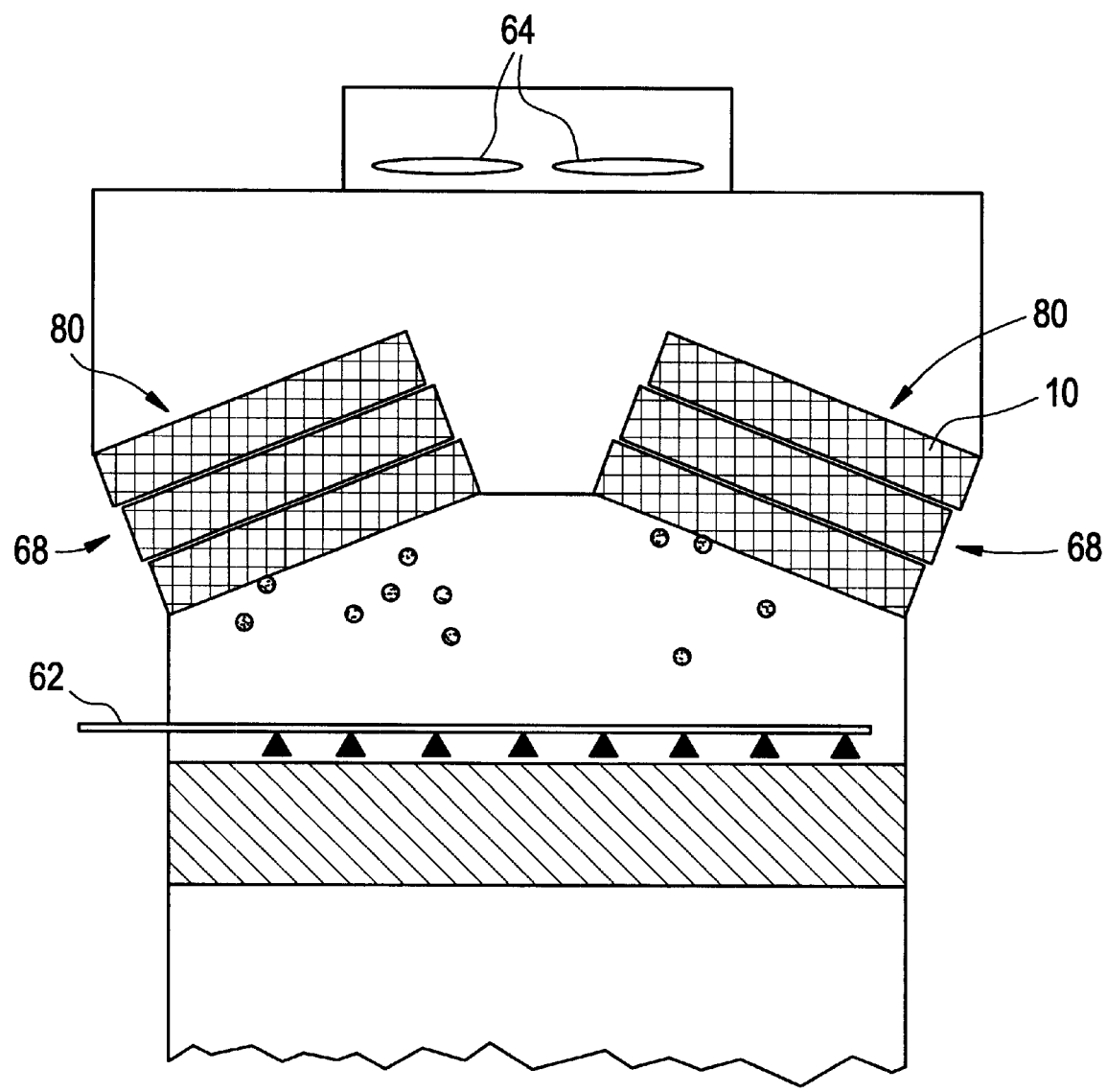
FIG. 10 is a block diagram representation of a cooling tower in accordance with another preferred embodiment of the invention.

A third way to configure the heat exchanger 10, as depicted in FIG. 10, is to tilt the heat exchanger pack 10 upward 80 toward the fan 64. This configuration would provide an increased flow area for the heat exchanger and reduce the pressure drop as described previously. This configuration would also provide an improved air path for the air flowing on the inward-facing portion 68 of the heat exchanger 10 (cold path), since the outlet of the pathway is positioned more towards the fan 64. The improved air path will result in less resistance and pressure drop for the heat exchanger cold side. Tilting heat exchanger 10 may also be accomplished without cantilevering heat exchanger 10 beyond cooling tower media 60.

Figure 11:
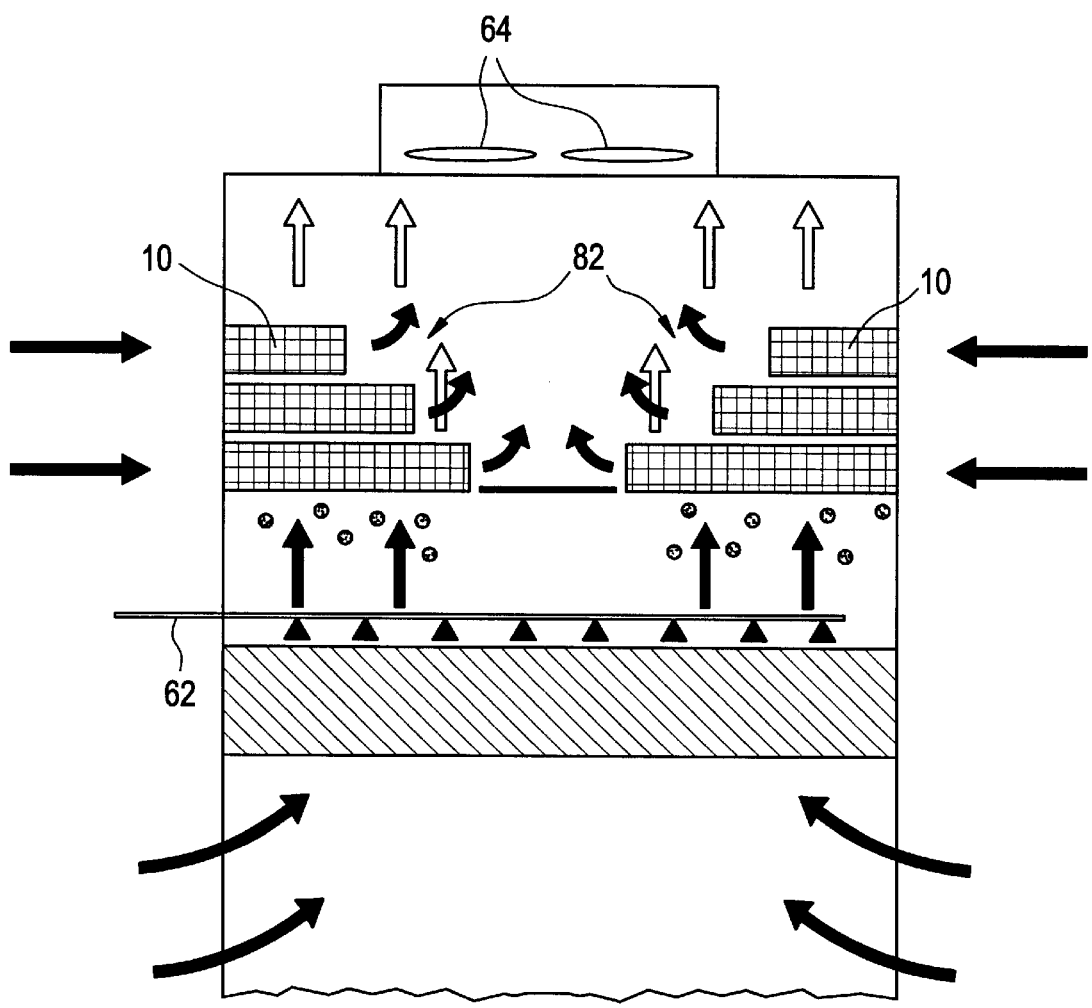
FIG. 11 is a block diagram representation of a cooling tower in accordance with another preferred embodiment of the invention.
Figure 12:
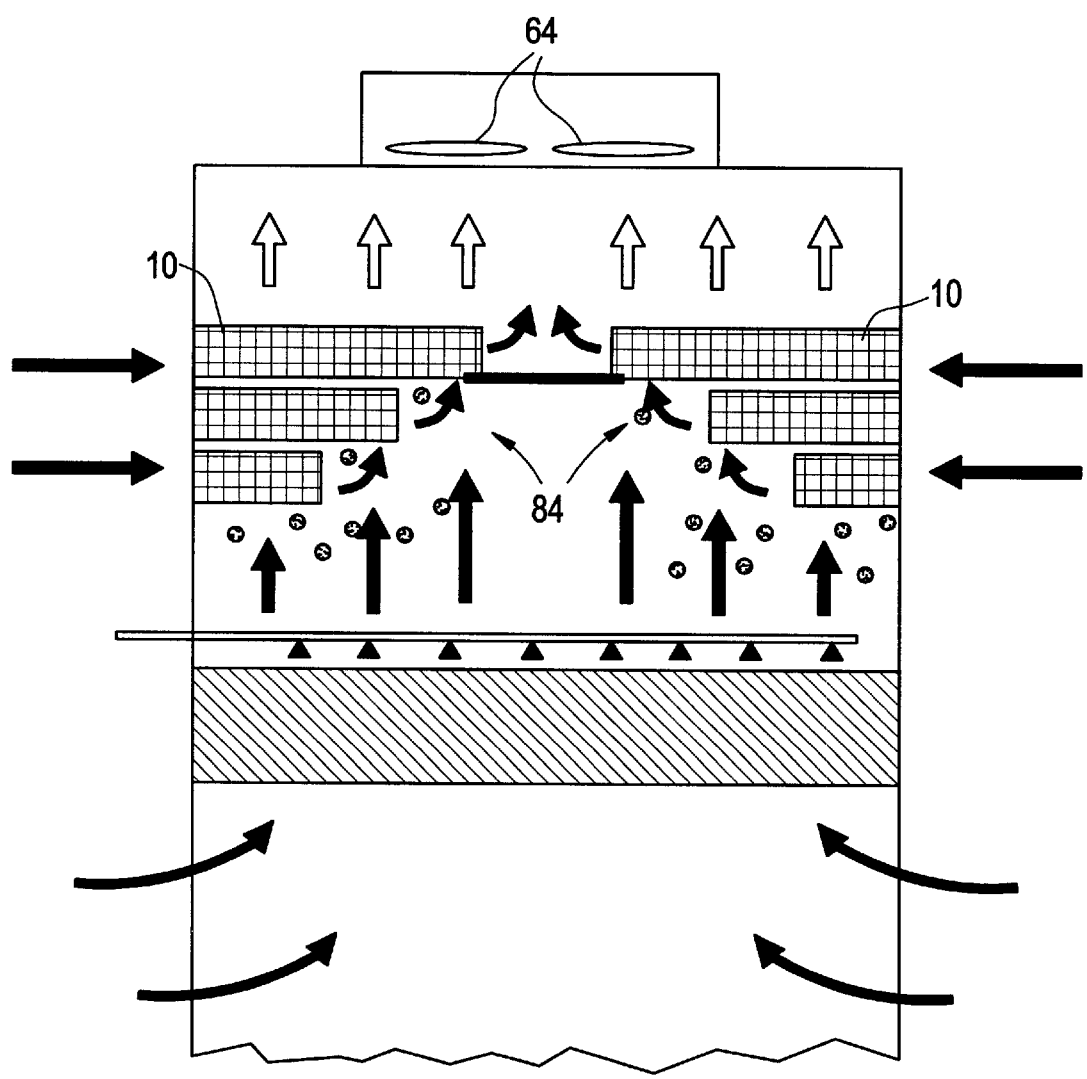
FIG. 12 is a block diagram representation of a cooling tower in accordance with another preferred embodiment of the invention.

In the configuration of FIG. 11 the length of the heat exchanger pack 10 has been reduced in the upper sections 82. In this configuration the pressure drop of the system will be reduced because there is less heat exchanger media for the warm moist air to travel through. It will also provide better mixing of the moist air stream and the dry air stream. The mixing of the two air streams is important in the plume abatement process in order to ensure that warm moist air does not mix with the cold ambient air to form a fog. Similarly, as depicted in FIG. 12, the lower portions of the heat exchanger pack 10 can be reduced 84 to reduce pressure drop.

Figure 13:
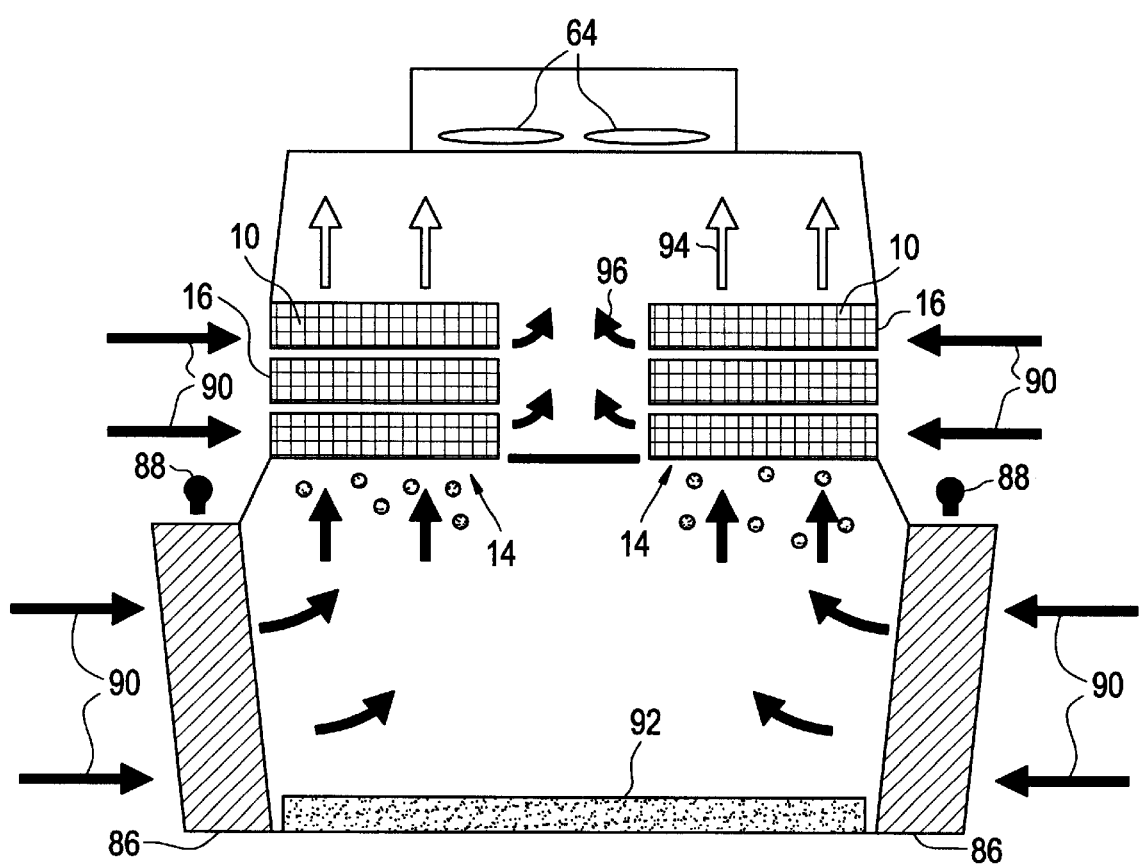
FIG. 13 is a block diagram representation of a cooling tower in accordance with another preferred embodiment of the invention.

In an alternate embodiment of the cooling tower, the counterflow evaporative media is replaced with a crossflow media 86 as depicted in FIG. 13. The heat exchanger media 10 is located in the path of the exiting wet air stream in the plenum of the crossflow cooling tower. The placement of the heat exchanger 10 and evaporative media 86 in this configuration would be best for the water purification and plume abatement processes. The operation of this cooling tower is as described below.

Hot water from the heat source is pumped to water distribution system 88 and distributed over the crossflow evaporative media 86. An axial fan 64 assists airflow of the ambient air 90 through the evaporative media 86 and through the inward-facing panel 16 of the heat exchanger 10. Air currents exiting the evaporative media 86 are directed upward through the outward-facing panel 14 of the vapor-condensing media (heat exchanger) 10. The cool ambient air 90 condenses the vapor on the outward-facing panel. The condensate falls from the heat exchanger back into reservoir 92 where it can be collected for other uses or returned back into the main circulating water system. The air streams from both the inward-facing panel and the outward-facing panel 94, 96 are combined near the fan inlet.

It is to be further understood that the doors 74 and 76 as shown in FIGS. 7A, 7B, 8A, and 8B for counterflow cooling towers may be readily incorporated in crossflow cooling tower configurations. Furthermore, the tilting of heat exchanger pack 10 and the stepping of the heat exchanger pack 10 as shown in FIGS. 10, 11, and 12 for counterflow cooling towers may be readily incorporated in crossflow cooling towers.

Figure 14:
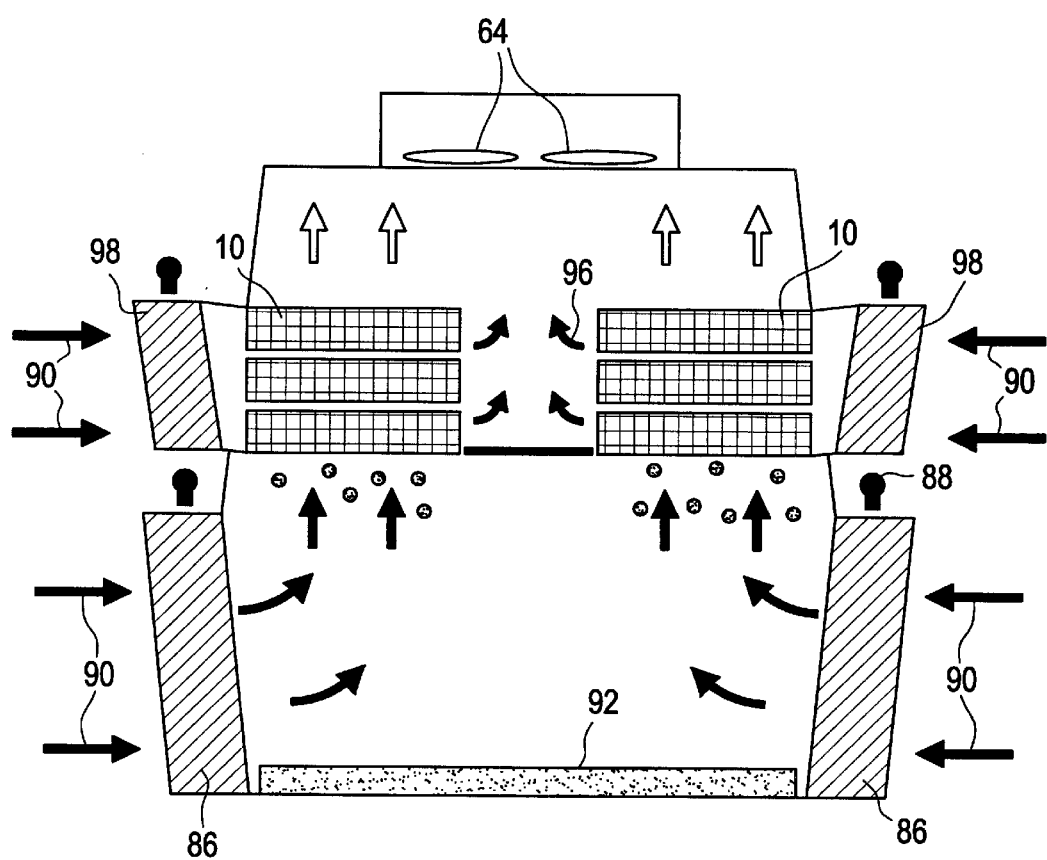
FIG. 14 is a block diagram representation of a cooling tower in accordance with another preferred embodiment of the invention.

During operation of the system as a water purification or desalination system the ambient temperatures may not be cold enough to provide the desired output of clean water from the condensation process. In order to boost the output of clean water from the heat exchanger 10 a secondary system may be required to reduce the temperature entering into the cold side of the heat exchanger 10. As shown in FIG. 14, another bank of cooling tower heat transfer media 98 may be placed in front of the cold side entrance of the heat exchanger 10. The cooling tower media 98 would be sprayed with cold water to chill the incoming air. A possible source for the cold water may be an ocean source or other large body of water that is cooler than the ambient dry bulb. If the wet bulb temperature is low, the cold water source does not necessarily have to be significantly colder than the ambient dry bulb. The air would then enter in the cooling tower media and the temperature of the air reduced before entering into the cold side of the heat exchanger.

Figure 15:
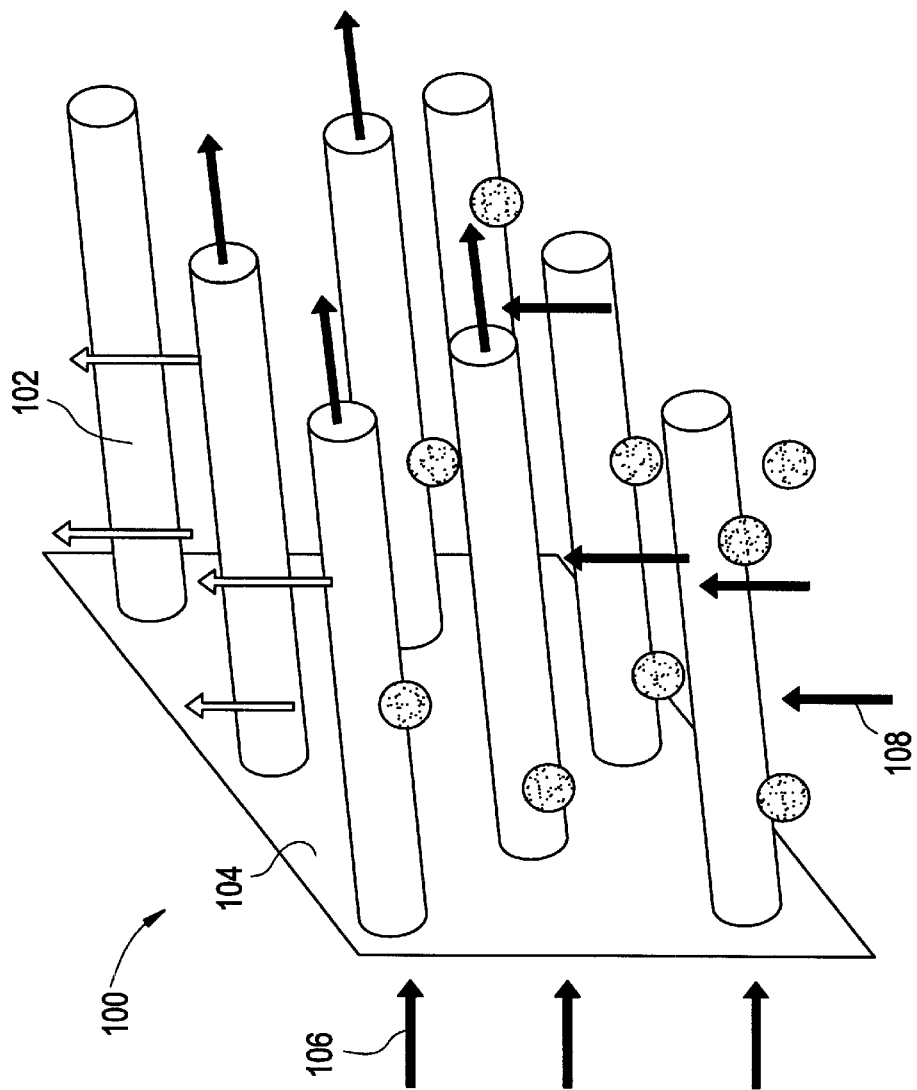
FIG. 15 is an illustration of a tubular heat exchanger in accordance with a preferred embodiment of the present invention.

In an alternate embodiment depicted in FIG. 15, a tubular heat exchanger 100 is used to replace the thin resin synthetic sheet pack 10. This tubular heat exchanger will provide the same type of thermodynamic properties as the thin resin synthetic sheet pack. The tubes 102 of the tubular heat exchanger could be made from a thin synthetic material as the previously described heat exchanger or possibly a corrosion resistant metal such as galvanized stovepipe. These tubes 102 would be attached to a sheet 104 with holes so that the cold ambient air flowing inside the pipes 106 was separated from the warm moist air flowing over the pipes 108. In a preferred embodiment, the tubes 102 are six inches in diameter. The cooling tower configurations used with this type of heat exchanger 100 are the same as shown previously.

Figure 16:
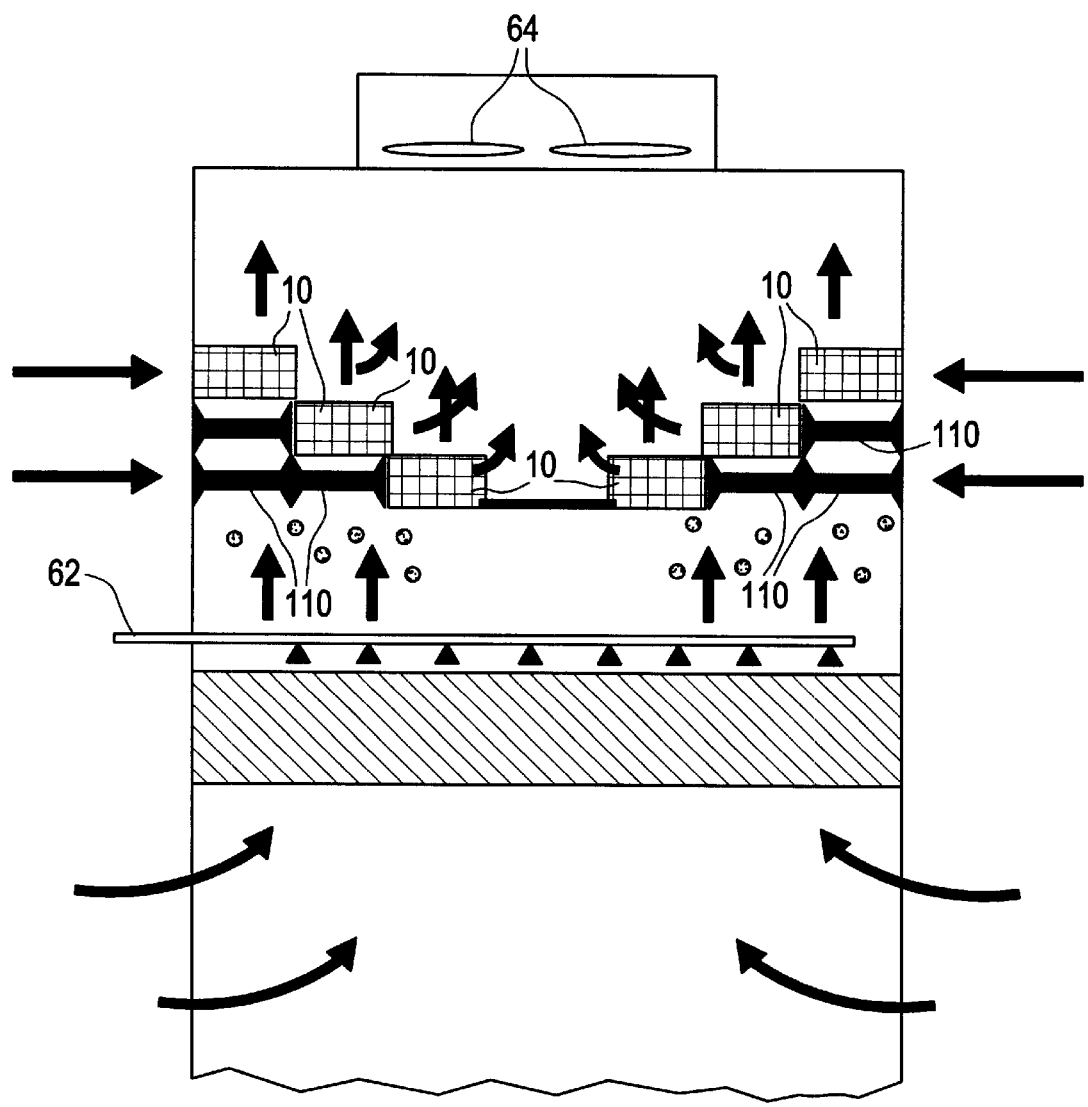
FIG. 16 is a block diagram representative of a cooling tower in accordance with another preferred embodiment of the invention.
Figure 17:
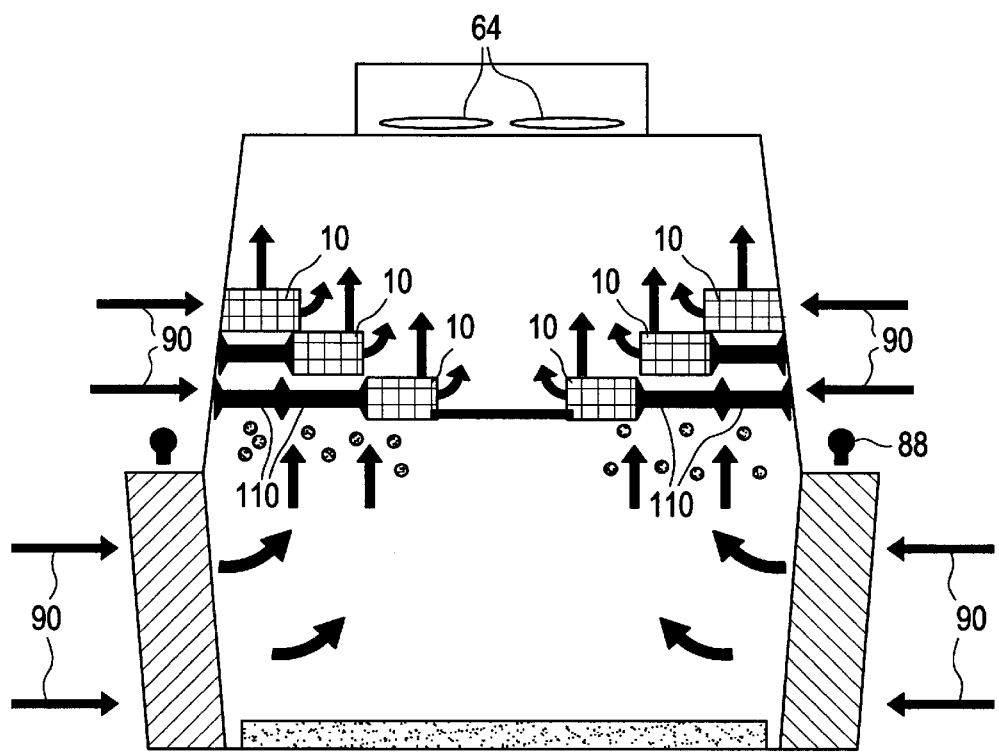
FIG. 17 is a block diagram representative of a cooling tower in accordance with another preferred embodiment of the invention.

In alternate embodiments of the cooling tower for counterflow, FIG. 16, and crossflow systems, FIG. 17, outside ambient air may be ducted to heat exchanger packs 10 located in the plenum area through one or more ducts 10. The packs would typically be in a staggered diagonal pattern. In this pattern the packs are not stacked directly above each other, thereby reducing the total pressure drop in the system. This embodiment reduces the total amount of heat exchanger 10 required by supplying cold ambient air to each heat exchanger section thus creating maximum heat transfer in each heat exchanger section. In this configuration, the geometry provides better mixing by intermingling the two airstreams. This will assist in plume reduction.

Gas to gas heat exchangers that transfer heat between two different gas streams are commonly used in industrial and power generation processes. One type of gas-to-gas heat exchanger is called a plate-fin heat exchanger. These heat exchangers are usually made of metal and consist of a flat sheet separated by a series of corrugated sheets. The corrugated sheet serves to provide structural support to the heat exchanger and provide increased heat transfer by changing the flow structure in the boundary layer and increased heat conductivity to the separating plate (fin). The separating sheet, also known as the parting sheet, separates the two air streams and transfers the heat between the two gas streams by heat conductivity. See "Process Heat Transfer", Hewitt, Shires, and Bott, CRC Press, Inc. 1994.

An advantage of the heat exchanger of the present invention is its lighter weight. For the preferred embodiment shown in FIG. 16, the operating weight for a tower with 6' bays is about 1100 lbs. The operating weight of an equivalently performing plastic heat exchanger, such as that of the Kinney '094 patent, is about 2200 lbs. Furthermore, the invention of '094 concentrates the weight at the outboard columns, whereas the weight of the heat exchanger in FIG. 16 is spread over 3 bays. This reduces the amount of load added to individual columns. Less weight or mass is also desirable for seismic design.

The present invention provides economic advantage over conventional plume abatement and water conservation. As previously mentioned the air-to-air heat exchanger avoids the cost of having to pipe hot water to the dry section of the cooling tower. Not only is the cost of the piping avoided, but also the additional cost of pumping the water over the dry section is avoided. However, the fans experience an increase in static pressure due to pulling the wet air stream through the air-to-air heat exchanger. The present invention requires approximately the same amount of power when compared to conventional 2 pass coils with a siphon loop to minimize head or less power when compared to single pass coils or the invention by Kinney in '094. In the later case the total power saving can amount to about 15' of head which for 200,000 gpm tower flow is about 900 horsepower. At $0.03/kw-hr this is a savings of about $175,000 year.

Of more importance than the power savings are the maintenance and required water quality cost savings. Coils typically have 1" to 1.25" diameter tubes. Larger tubes are typically not sufficient for the required heat transfer. Water quality must be sufficient to prevent fouling and plugging of the tubes. In the case of seawater or salt water the conventional finned tubes must be made of premium materials. This may be avoided by using the plastic heat exchanger as disclosed by Kinney in '094, the disclosure of which is incorporated herein by reference. However, the heat exchanger water passages in Kinney '094 are more restrictive than coils. If the water quality is not sufficient, filtration and or chemical treatment must be employed to improve and maintain water quality. This can be expensive. The present invention avoids the cost of improving and maintaining water quality. The moisture in the wet air stream is nearly pure which will not foul the air to air heat exchanger. Water quality less than has been thought possible for plume abatement or water conservation may be used with the present invention Also, some cooling tower applications may have water with debris larger than the heat exchanger passageways which would plug the passageways. An example is a "once through" power plant application in which water is extracted from a river or other body of water, heated by passing through the condenser, and then sent to a cooling tower before discharging back into the body of water. The wet section of the cooling tower may have splash fill and large orifice water distribution nozzles such as disclosed in U.S. Pat. No. 4,700,893 issued to the present assignee. The '893 invention has been commercialized with 1.875" and 2.5" diameter orifices and could theoretically be larger. Therefore, water with debris larger than previously thought possible for plume abatement can be used.

The wet section of the cooling tower may have splash fill and large orifice water distribution nozzles such as disclosed by Bugler in U.S. Pat. No. 4,700,893, the disclosure of which is incorporated herein by reference. Thus fouling maintenance and water quality improvement costs are avoided. This can have an economic impact of $1,000,000 per year or more on a large power plant tower.

Finally, the initial capital cost of the present invention is less than that of the prior art. Plume abatement towers typically cost 2 to 3 times the cost of a conventional wet only tower. For a large power plant installation the plume abatement tower may cost $6,000,000 or more. The savings of the present invention can be $1,000,000 or more over conventional coil technology.

For desalination the cost per 1000 gallons of water is about $1.50 compared to $4 with multi-stage flash desalination and $3 for reverse osmosis. The present invention requires secondary treatment to produce potable water. This adds about $0.50/1000 gallons. For a plant producing 5 million gallons per day, this process can save $5,000 to $7,500 per day or about $2,000,000 annually.

The present invention provides plume abatement as a by-product on towers designed for desalination at no cost. Alternately, for cooling tower applications requiring plume abatement, desalination can be a by-product for the very little cost of collection by employing this invention. The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. A method of reducing the moisture content of an air stream traveling through a cooling tower having evaporative media, comprising the steps of:
    directing a first air stream having a flow rate between 10 and 80 pounds of dry air per square foot per minute (pda/ft²/min) and a relative humidity at or above 90% through a first set of passageways,
    directing a second air stream having a flow rate between 10 and 80 pda/ft²/min and an entrance dry bulb temperature at least five Fahrenheit degrees below the first stream through a second set of passageways each passageway of said first set of passageways being separated from at least one passageway of said second set of passageways by a thin heat conductive material;
    absorbing heat from said first air stream into said second air stream with a heat exchanger;
    condensing water out of the first air stream;
    capturing the water condensed out of said first air stream in a reservoir; and
    preventing effluent from passing around the heat exchanger by using a covering disposed at the bottom of the heat exchanger.

2. The method of claim 1 wherein said step of directing a first air stream and said step of directing a second air stream are accomplished using a single air directing device.

3. The method of claim 2 wherein the air directing device is a fan.

4. The method of claim 3 wherein the differential pressure inside each first passageway and each second passageway is between positive six millibars and negative six millibars.

5. The method of claim 4 wherein the differential pressure inside each first passageway and each second passageway is between positive 3 millibars and negative 3 millibars.

6. The method of claim 4, wherein said first air stream is obtained from a cooling tower effluent.

7. The method of claim 6, wherein said second air stream is obtained from the ambient air outside the cooling tower.

8. The method of claim 6, further comprising the step of returning the captured water to the cooling tower reservoir.

9. The method of claim 6, further comprising the step of purifying the captured water.

10. The method of claim 9, wherein the step of purifying the captured water is performed using a reverse osmosis process.

11. The method of claim 1 wherein the first set of passageways are formed through cylindrical tubes and wherein the second set of passageways are the spaces around the cylindrical tubes.

12. Apparatus for reducing the moisture content of an air stream traveling through a cooling tower having evaporative media, comprising:
    means for absorbing heat from a first air stream into a second air stream, said absorbing
    means having a first set of passageways and a second set of passageways; means for directing a first air stream having a flow rate between 10 and 80 pounds of dry air per square foot per minute (pda/ft²/min) and a relative humidity at or above 90% through said first set of passageways of said absorbing means and for directing a second air stream having a flow rate between 10 and 80 pda/ft²/min and an entrance dry bulb temperature at least five Fahrenheit degrees below the first stream through said second set of passageways of said absorbing means each passageway of said first set of passageways being separated from at least one passageway of said second set of passageways by a thin heat conductive material;
    means for condensing water out of said first air stream;
    means for capturing the water condensed out of said first air stream; and
    means for preventing effluent from passing around said means for absorbing heat using a covering disposed at the bottom of said means for absorbing heat.

13. The apparatus of claim 12 wherein the pressure inside each first passageway and each second passageway is between positive six millibars and negative six millibars.

14. The apparatus of claim 13, wherein said first air stream is obtained from a cooling tower effluent.

15. The apparatus of claim 14, further comprising means for returning the captured water to the means for capturing water.

16. The apparatus of claim 14, further comprising means for purifying the captured water.

17. The apparatus of claim 16, wherein the means for purifying the captured water performs a reverse osmosis process.

18. The apparatus of claim 12 wherein the first set of passageways are formed through cylindrical tubes and wherein the second set of passageways are the spaces around the cylindrical tubes.

19. The apparatus of claim 12, wherein the first set of passageways and the second set of passageways are formed by sandwiching thin sheets together.

20. The apparatus of claim 19, further comprising positively raised edges along two parallel edges of the thin sheet material and negatively raised edges along the two parallel edges of the thin sheets perpendicular to the edges having the positively raised edges;
    said first passageways being formed by reversing two sheets and bonding the positively raised edges on one side together and the positively raised edges on the other side together; and
    said second passageways being formed by reversing two sheets and bonding the negatively raised edges on one side together and the negatively raised edges on the other side together.

21. The apparatus of claim 20, wherein said first passageways can be oriented perpendicular to said second passageways by alternately bonding the negatively raised edges and the positively raised edges in a set of thin sheets.

22. The apparatus of claim 21, further comprising positively and negatively formed buttons in the thin sheets for maintaining the passageways open under differential pressure between said first passageways and said second passageways.

23. The apparatus of claim 22, wherein the positively formed buttons on a first sheet press against the positively formed buttons on a first adjacent sheet and the negatively formed buttons press against the negatively formed buttons on a second adjacent sheet.

24. The apparatus of claim 23, wherein the positively formed buttons are configured to reduce resistance to flow of the first air stream in a first direction and the negatively formed buttons are configured to reduce resistance to flow of the second air stream in a second direction.

25. The apparatus of claim 24, wherein said thin sheets are made of a synthetic resin film.

26. The apparatus of claim 25, wherein said thin sheets are made of PVC.

* * * * *